No. 728,592. PATENTED MAY 19, 1903.
J. MACPHAIL.
SELF FASTENING SPRING TOOTH FOR HAY RAKES OR OTHER IMPLEMENTS.
APPLICATION FILED OCT. 1, 1902.
NO MODEL.
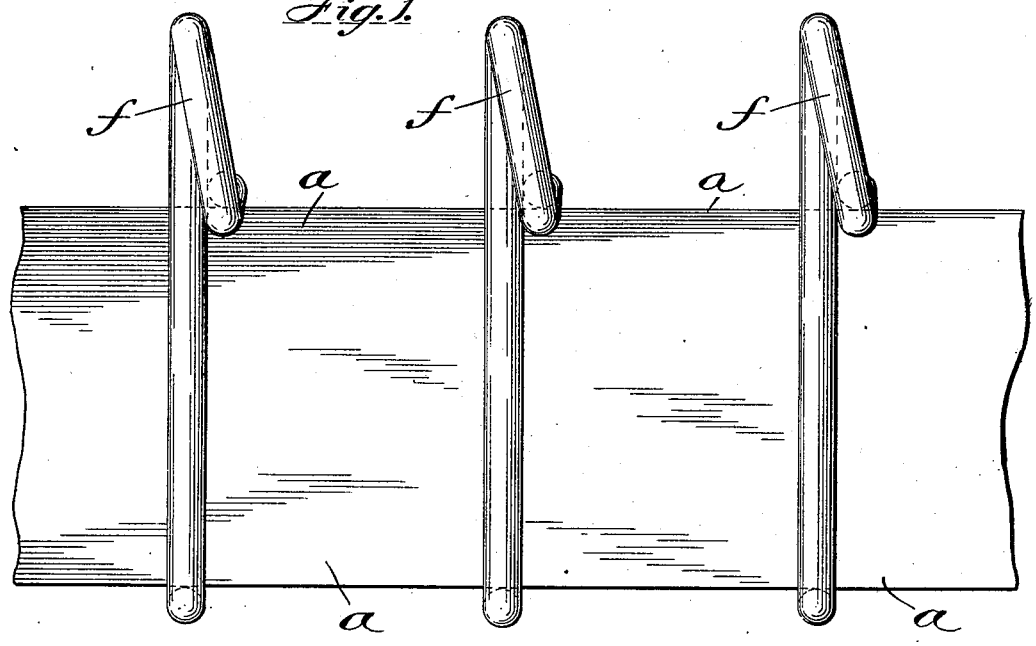
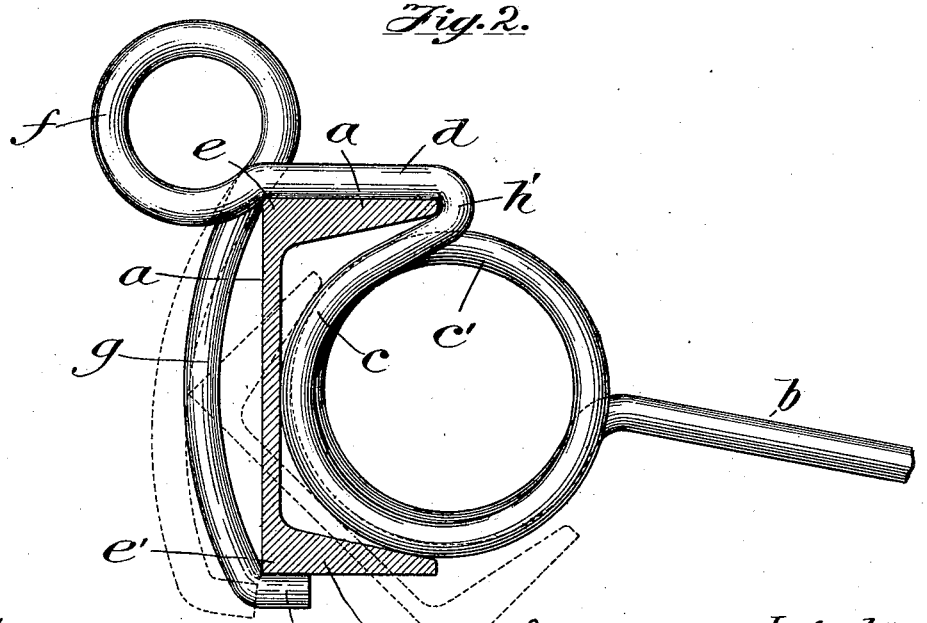

No. 728,592. Patented May 19, 1903.

UNITED STATES PATENT OFFICE.

JAMES MACPHAIL, OF BLUE ISLAND, ILLINOIS, ASSIGNOR TO INTERNATIONAL HARVESTER COMPANY, OF CHICAGO, ILLINOIS, A CORPORATION OF NEW JERSEY.

SELF-FASTENING SPRING-TOOTH FOR HAY-RAKES OR OTHER IMPLEMENTS.

SPECIFICATION forming part of Letters Patent No. 728,592, dated May 19, 1903.

Application filed October 1, 1902. Serial No. 125,549. (No model.)

*To all whom it may concern:*

Be it known that I, JAMES MACPHAIL, a citizen of the United States, residing at Blue Island, county of Cook, State of Illinois, have invented certain new and useful Improvements in Self-Fastening Spring-Teeth for Hay-Rakes or other Implements; and I do hereby declare the following to be a full, clear, and exact description of the invention, such as will enable others skilled in the art to which it appertains to make and use the same.

Although the invention is of general application to all implements employing spring-teeth, it relates more especially to the manner of securing the spring-teeth of horse hay-rakes to the heads of the rakes and has for its particular object to do away with all bolts, nuts, and other separate fastening devices, as well as to avoid the cutting or perforating of the heads.

Of late years it has become quite common to make the tooth-heads of horse hay-rakes out of angle-iron, various forms—such as channel-iron, T-iron, &c.—being used. The teeth of these rakes are now invariably made of spring-wire, and they are usually secured to the angle-iron heads by bolts, nuts, or other fastenings that are separate from the heads and teeth. Sometimes, however, these fastenings have been dispensed with and the flanges of the heads have been provided with perforations or slots or otherwise cut to receive the end portions of the teeth.

The present invention has been devised with a view to obviate the necessity of cutting or slotting the heads in any way, as well as to do away with all bolts, nuts, or other separate fastenings; and it consists in so bending the upper ends of the teeth that they will grip the heads exteriorly and by their own resilience hold themselves firmly in place.

The invention is illustrated in the accompanying drawings, where—

Figure 1 is an elevation of a portion of a tooth-head, looking at the front side; and Fig. 2 is a cross-section of the head, showing the manner of bending the tooth to adapt it to automatically fasten itself to a head of the channel-iron form.

Referring to the views, $a$ is the head. As here shown it is made of ordinary channel-iron with two horizontal flanges and one vertical flange. It is to be understood, however, that the invention is not limited to the employment of a head of this form, as any other form of head may be employed that is angular in cross-section.

The tooth $b$ is made of spring-wire, as usual, and is provided near its upper end with two coils $c\ c'$, one of which is made a little smaller than the other for a purpose that will presently be explained. Beyond the coils the wire of the tooth is bent horizontally forward, as at $d$, so as to lie flat upon the top of the upper horizontal flange of the head, and from the front upper corner $e$ of the channel-iron it extends farther forward and downward and is then bent upwardly, backwardly, and forwardly, forming an eye or ring $f$, after which the end of the wire is continued farther downwardly along the front vertical face of the channel-iron, as at $g$, to the front lower corner $e'$, where it is provided with a short rearwardly-extending horizontal portion $h$, that lies against the under surface of the lower horizontal flange and is parallel with the forward extension $d$, above referred to. The vertical portion $g$ of the wire is preferably bowed outwardly, as shown in Fig. 2, so as to give it the necessary resiliency, and it will be noted that upper flange of the head is firmly gripped between this vertical part of the wire and the bend formed at $h'$ between the coils $c\ c'$ and the forward extension. With this construction the tooth has a grip upon the head at the three exterior angles of the head—viz., $h'$, $e$, and $e'$—which is sufficient for all practical purposes. The larger one, $c$, of the coils $c\ c'$ is, however, utilized to still further steady and strengthen the fastening, and for this purpose it is made of a size to bear against the interior walls of the channeled or recessed rear face of the head. The other coil, $c'$, is made a little smaller, so as not to bear against the walls of the head, the reason for this being that contact with these walls destroys the elasticity of the coils, and as the working resilience of the tooth is derived largely from these coils it would be impractical to have them both bear on the head. The coil $c'$ being therefore free of the inner walls of the recessed head it is free to impart the necessary resilience to the working part of the tooth. The construction being as thus described, it only remains to be noted that the essential feature of the arrangement is that, whatever the form of the head is, the tooth should be bent at its upper end into angular form corresponding to its exterior angles. Therefore other forms of heads—such as T-iron, angle-iron, &c.—are equally within the spirit and scope of the invention as the form herein illustrated. It is also to be noted that, although the invention is above described in connection with horse hay-rakes, it is applicable to harrows, cultivators, and other implements and machines that employ spring-teeth which are secured to bars or heads. The invention and the claims hereinafter made thereon are not to be understood, therefore, as limited to the machine herein illustrated and described or to any particular machine or implement.

Having thus described my invention, what I claim, and desire to secure, is—

1. The combination with an angle-iron tooth-head, of a spring-tooth bent at its upper end into angular form corresponding to the exterior angles of the head, and held in place on the head wholly by its own resilience without the employment of separate fastenings, or cutting or perforating the head.

2. The combination with an angle-iron tooth-head, of a spring-tooth bent at its upper end into angular form corresponding to the exterior angles of the head, said tooth having also a plurality of coils lying in the recessed side of the head, one of said coils engaging the interior walls of the head to assist in holding the tooth, and the other coil being free of said walls so as to provide the necessary elasticity for the working portion of the tooth.

3. The combination with a tooth-head of channel-iron having two horizontal flanges and one vertical flange, of a spring-tooth bent at its upper end as at $h'$, and having a horizontal extension $d$ projecting forward across the top flange, a vertical extension $g$ passing downward across the front face of the head, a rearward extension $h$ engaging the lower corner $e'$ of the head, and a coil $c$ engaging the inner walls of the vertical and lower horizontal flanges.

4. The combination with a tooth-head of angle-iron having a horizontal and a vertical flange, of a spring-tooth bent at its upper end as at $h'$, and having a horizontal extension $d$ projecting forward across the horizontal flange, a vertical extension $g$ passing downward across the vertical flange, and a rear extension $h$ engaging the lower corner of the vertical flange.

In testimony whereof I affix my signature in presence of two witnesses.

JAMES MACPHAIL.

Witnesses:
CHAS. N. CHAMBERS,
G. A. RANNEY.